S. B. STORER.
SPEED RECORDER.
APPLICATION FILED MAY 24, 1910. RENEWED DEC. 26, 1914.
1,148,126.
Patented July 27, 1915.
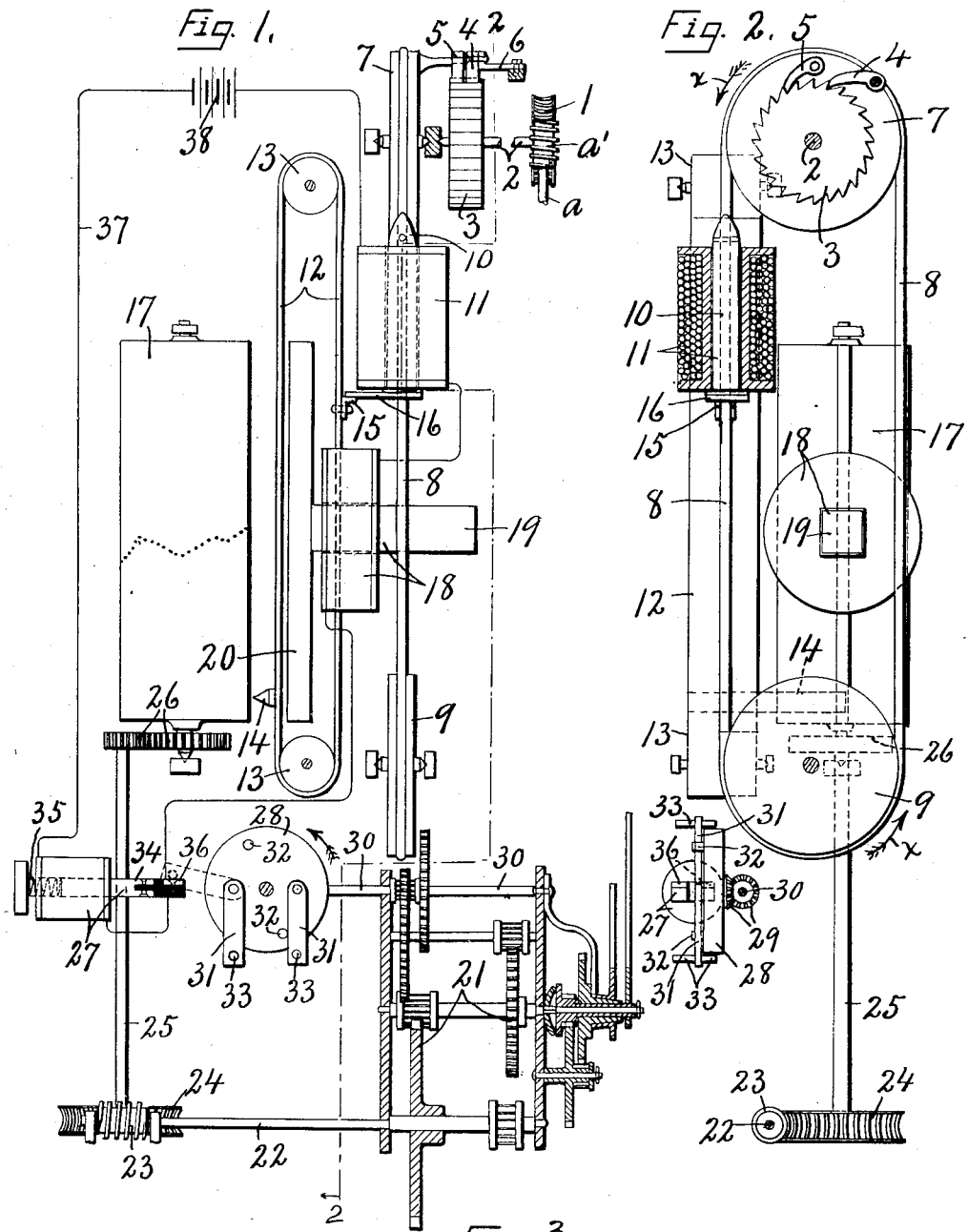
WITNESSES.
R. W. Bailey
H. E. Chace
INVENTOR.
S. B. Storer
BY
Howard P. Denison
ATTORNEY.

UNITED STATES PATENT OFFICE.

SIMON B. STORER, OF SYRACUSE, NEW YORK, ASSIGNOR, BY MESNE ASSIGNMENTS, TO CHICAGO ELECTRIC METER COMPANY, OF CHICAGO, ILLINOIS, A CORPORATION OF ILLINOIS.

SPEED-RECORDER.

1,148,126. Specification of Letters Patent. Patented July 27, 1915.

Application filed May 24, 1910, Serial No. 563,107. Renewed December 26, 1914. Serial No. 879,232.

*To all whom it may concern:*

Be it known that I, SIMON B. STORER, of Syracuse, in the county of Onondaga, in the State of New York, have invented new and useful Improvements in Speed - Recorders, of which the following, taken in connection with the accompanying drawings, is a full, clear, and exact description.

This invention relates to certain improvements in speed recorders of the class set forth in my pending application No. 337,315, filed October 3, 1906, for automatically producing a graphic record of the number of revolutions or average speeds of a revolving element at regular periods, such as minutes, during predetermined intervals of time, as hours.

In my pending application referred to the recording element is moved in one direction along the record receiving element by the revoluble driving element, the speed of which is to be tested, and, while it is entirely practicable and efficient in producing the results desired, it involves the use of unnecessarily complicated mechanisms for making and breaking the connection between the driving element and the recording element.

The object of my present invention is to render the action of the recording element more positive and more instantaneous in making an impression and also in its return after making such an impression so as to produce a more accurate and closer record of the average rate of speed of the rotating element. In other words I have sought to move the recording device in one direction relatively to the record receiving element by means of a weighted member controlled but not operated by the revoluble meter element so that its speed of movement by its own gravity and also that of the recording element will be exactly proportionate to that of the rotary element.

Another object is to provide electrical means for making the impression at the end of a predetermined interval of time, as one minute, and for simultaneously and instantly returning the weighted member to its starting position, and at the same time permitting the recording element to return to or toward its starting position ready for a repetition of the operation.

Other objects and uses relating to specific parts of the instrument will be brought out in the following description.

In the drawings: Figure 1 is a front elevation of a speed recording instrument embodying the various features of my invention showing a portion of a chronometer or clock partly in section. Fig. 2 is a sectional view taken on line 2—2, Fig. 1, showing the greater portion of the mechanism seen in Fig. 1 in side elevation, but omitting the chronometer. Fig. 3 is a top plan of the electric switch showing the winding of the solenoid in section.

This instrument is adapted to be used in connection with any revolving element for recording the relative rates of speed for consecutive predetermined intervals of time and in this particular instance I have shown one of the revolving elements, as —$a$—, of a watt meter not shown, said revolving meter being provided with a worm —$a'$— and meshing with a worm gear —1—, the latter being secured to a revolving shaft —2—. A ratchet wheel —3— is also secured to this shaft and is engaged by a pair of pawls —4— and —5—, the pawl —4— being mounted upon a fixed support —6—. The pawl —5— is mounted upon one side of a pulley —7— which is coaxial with, but movable in one direction independently of the ratchet wheel —3— and is connected by a belt —8— to an underlying pulley —9—. Secured to one side of the belt —8— is a weight —10— consisting of the core or plunger of a solenoid —11— which is held in a fixed position by any suitable supporting means and surrounds this portion of the belt between the pulleys —7— and —9—. The weighted member —10— operates to draw the adjacent side of the belt downward thereby rotating the pulleys —7— and —9— in the direction indicated by arrows —$x$—, Fig. 2, and forcing the pawl —5— into engagement with the ratchet wheel —3— which is rotated in the same direction at a speed proportionate to that of the revolving member —$a$—, the pawl —4— serving to prevent backward movement of the ratchet wheel —3—.

The ratchet wheel —3— and the pawl —5— constitute what may be termed an escapement or governing device for preventing the suddent descent of the weighted side of the belt —8— and permitting such weighted side to travel at the same relative rate of speed as the ratchet wheel —3— or at a speed proportionate to that of the rotating member —a—.

The action or descent of the weighted member —10— under its own gravity is utilized to operate a movable marker support consisting in this instance of a belt —12— running parallel with and in proximity to the line of movement of the weighted side of the belt —8— and having its lower and upper ends passed around suitable supporting pulleys or drums —13—. One side of the belt is provided with a marker or recording device —14—, while the opposite side is provided with a shoulder —15— which is disposed in the path of movement of an operating arm —16— on the weighted side of the belt —8—, said arm —16— being preferably secured to the lower end of the plunger —10—. The side of the belt —12— to which the recording device —14— is secured is also weighted preferably by the weight of the recording device and just sufficient to raise the shoulder —15—, but of considerably less weight than that of the plunger —10— so as to allow the latter when released to operate the belt —12— to move the marker —14— along a record receiving cylinder —17— at a speed proportionate to that of the rotating element —a—. The cylinder —17— is located in an upright position parallel with and at one side of the plane of the belt —12— and therefore the recording device —14— which is secured to the adjacent side of said belt extends laterally across to substantially the longitudinal center of the cylinder and is adapted to be operated in a manner, hereinafter described, for making an impression upon a suitable receiving element on said cylinder.

As shown in the drawings, preferably Fig. 2, the recording device —14— is pressed into contact with the record receiving element on the cylinder —17— at the end of regular predetermined intervals of time, as one minute, by means of a solenoid —18— having its plunger —19— provided with an elongated head —20— parallel with the adjacent face of the cylinder and just at the back of the laterally projecting end of the recording device —14—, so that the latter will always be in a position between said head and adjacent face of the cylinder ready to be operated to make an impression at any point in its travel.

The cylinder —17— is chronometer rotated by a suitable clock train —21— having one of its spindles, as —22— provided with a worm —23— which meshes with a worm gear —24— on an upright shaft —25—, the latter being connected by gears —26— to the cylinder —17—. The connections between the clock train and cylinder are proportioned so as to rotate the cylinder at a comparatively low rate of speed, preferably one complete revolution per hour or some multiple thereof.

The action of the recording device is controlled through the medium of a chronometer actuated electric switch of special construction involving the use of a solenoid —27— and a revolving element —28— which is connected by gears —29— to one of the revolving spindles, as —30—, of the clock train —21—.

The revolving element or disk —28— is preferably rotated one revolution every two minutes and upon this disk is pivoted, at diametrically opposite sides of its axis, a pair of arms —31— which are free to gravitate or swing upon their pivots and are carried forwardly in the direction of rotation of the disk by pins —32—, each arm being provided with oppositely projecting contact pins —33— of electric conducting material.

The movable plunger, as —34—, of the solenoid —27— is spring pressed inwardly toward the disk —28— by a spring —35—, its inner end being furcated and provided with opposite contact terminals —36— preferably insulated from the remaining portions of the core and normally lying in the path of movement of the contact pins —33—, so that as the arms —31— are carried forwardly beyond an upright position they immediately gravitate in the same direction between the contact terminals —36—, thereby allowing the contact pins —33— to contact with and close the circuit across said terminals.

The several solenoids —11—, —18— and —27— are preferably connected in series or in the same circuit, as —37—, to which current is supplied from any suitable source of electric energy, as a battery —38—, so that all of the solenoids will be energized simultaneously.

It is now apparent that as each of the contact pins —33— is brought into contact with the terminals —36—, thus closing the circuit, all of the solenoids are instantly energized, the plunger —34— being drawn inwardly against the action of the spring —35— to withdraw the terminals —36— out of contact with the coacting pin —33—, whereupon the arm —31— carrying such pin immediately drops to its inactive position and the plunger —34— is then instantly retracted to its normal position by the spring —35— ready to receive the next contact pin. When the circuit is closed in the manner just described, the weighted plunger of the solenoid —11— and adjacent side of the belt —8— to which it is secured, is instantly drawn upward to the positions shown in Figs. 1 and 2 and at the same instant the plunger —19— of the solenoid —18— is actuated to press the recording device —14— into contact with the record receiving element on the cylinder —17—.

As soon as the plunger of the solenoid —11— is drawn upwardly to disengage the arm —16— from the shoulder —15—, the weight of the recording device —14— returns the corresponding side of the belt to or toward its starting position, this being accomplished between the closing and opening of the circuit by the electric switch.

At the instant of the breaking of the circuit, at which time the shoulder —15— will have been drawn upwardly, the weighted plunger of the solenoid —11— begins its descent, thereby causing the arm —16— to engage the shoulder —15— and move the recording device —14— along the solenoid —17— at a speed proportionate to that of the rotating element —a—, this movement continuing through a period of say one minute or from the time of the breaking of the circuit by the release of one of the contact pins —33— to the time of closing of the circuit by the succeeding contact pin whereupon the operation previously described is repeated. In this manner a record is made at the end of each fraction, as one minute, of a predetermined interval of time, as one hour, thereby making a graphic record showing the relative speeds for each successive minute, of the rotating member —a— and when used in connection with a watt meter enables the attendant to determine the average rate of consumption of current for any period of time.

What I claim is:

1. In a speed recorder, a revolving element, a record receiving element, a recording device, gravity operated means controlled by the revolving element for moving said device to a recording position, and chronometer controlled means for actuating the recording device to make an impression at the end of a predetermined time of travel of the gravity operated means.

2. In a speed recorder, a revolving element, a record receiving element, a recording device, gravity operated means controlled by the revolving element for moving said device in one direction, and chronometer controlled electrically operated means for making an impression at the end of a predetermined time of travel of the gravity operated means.

3. In a speed recorder, a revolving element, a record receiving element, a recording device, a gravity operated member controlled by and moving at a speed proportionate to that of the revolving element, means for transmitting such movement to the recording device, and chronometer controlled means brought into action at the end of a predetermined time during such movement for returning the weighted member to its starting position.

4. In a speed recorder, in combination with a revolving element, a record receiving element, a recording device, gravity operated means for moving the recording device to a recording position, means operated by the rotating element for governing the speed of movement of the gravity operated means, and chronometer controlled means for stopping the motion of the gravity operated means at the end of a predetermined interval of time.

5. In a speed recorder, in combination with a revolving part, a record receiving element, a record making element, means operating under a power separate from but in synchronism with the revolving part for moving the record making element relatively to the receiving element, and separate chronometer controlled electrical devices for actuating the record making element to make an impression at the end of a predetermined time of movement of the first named means and for returning the record making element to its starting position after making such impression.

6. In a speed recorder, in combination with a revolving element, a chronometer rotated record receiving element, a gravity operated record making element, means actuated by the revolving element for regulating the speed of movement of the gravity operated recording element, a chronometer and means controlled thereby for actuating the impression making element at the end of a predetermined time of movement of the revolving element.

7. In a speed recorder, a revolving element, a record receiving element, a recording device, a gravity operated member, means for transmitting motion from said member to the recording device, means actuated by the revolving element for regulating the speed of movement of the gravity operated member, an electrical device for returning the weighted member to its starting position, electrically operated means for actuating the recording device to make an impression, and chronometer controlled electric means for energizing said electrical devices simultaneously.

8. In a speed recording device, in combination with a revolving element the speed of which is to be recorded, a recording device moving in synchronism with the revolving element, electrical means for actuating the recording device to make an impression, an electric circuit in which said actuating means is connected and a chronometer controlled electric switch in said circuit, said switch including means brought into action by the closing of the circuit for the breaking such circuit.

9. In a speed recording device, in combination with a revolving element the speed of which is to be recorded, a recording device moving in synchronism with the revolving element, electrical means for actuating the recording device to make an impression, an electric circuit in which said actuating means is connected, a chronometer controlled electric switch in said circuit, said switch including means brought into action by the closing of the circuit for the breaking such circuit, gravity operated means for moving the recording device in one direction, an escapement synchronizing such operation with that of the revolving element, and means for actuating the recording device to make an impression at the end of a predetermined time of movement of said device.

10. In a speed recording device, the combination of a recording element, a driving device tending to actuate said recording element, a revoluble element, devices between said driving device and said revoluble element to control the operation of the driving device, and means for returning the driving device to its initial position independently of the recording element.

11. In a speed recorder, the combination of a recording device, electric mechanism included in an operating circuit of the recording device, and contacts adapted when moved to an operative position to cause the operation of said electric mechanism, said electric mechanism by its operation serving to cause said contacts to occupy an inoperative position.

12. In a speed recorder, the combination of a revoluble element, a record receiving device, a marking member capable of motion to a recording position relative to the record receiving device, and intermediate mechanism between the revoluble element and the marking device adapted by motion of the revoluble element to move the marking device proportionately to the speed of the revolving element, and means for returning the intermediate mechanism to its initial position independently of the marking member.

13. In a speed recorder, the combination of a revoluble element, a record receiving device, a marking member capable of motion to a recording position relative to the record receiving device, intermediate mechanism between the revoluble element and the marking device adapted by motion of the revoluble element to move the marking device proportionately to the speed of the revoluble element, and electromagnetic means for returning the intermediate mechanism to its initial position.

14. In a speed recording device, the combination of a recording element, a revoluble element, driving mechanism between the recording member and the revoluble element, and means for returning the driving mechanism to its initial position independently of the recording element.

15. In a speed recording device, the combination of a recording element, a revoluble element, driving mechanism between the recording member and the revoluble element, and means for returning the driving mechanism to its initial position independently of the recording element, and a stationary electromagnet for actuating the recording element to make a record for any position which the recording element may occupy.

16. In a speed recorder, the combination of a revoluble element, recording mechanism, an operating train for mechanically controlling the operation of the recording mechanism proportionately to the rotation of the revoluble element, and time controlled means for returning said operating train to its initial position.

17. In a speed recorder, the combination of a revoluble element, recording mechanism, an operating train for mechanically controlling the operation of the recording mechanism proportionately to the rotation of the revoluble element, and electromagnetic mechanism for returning the operating train to its initial position when desired.

18. In a speed recorder, the combination of a revoluble element, recording mechanism, an operating train for mechanically controlling the operation of the recording mechanism proportionately to the rotation of the revoluble element, and electromagnetic mechanism for returning the operating train to its initial position when desired independently of the recording mechanism.

In witness whereof I have hereunto set my hand on this 20th day of May 1910.

SIMON B. STORER.

Witnesses:
H. E. CHASE,
A. L. HUMPHREY.

Copies of this patent may be obtained for five cents each, by addressing the "Commissioner of Patents, Washington, D. C."